United States Patent [19]

Vossbeck et al.

[11] Patent Number: 4,821,565

[45] Date of Patent: Apr. 18, 1989

[54] DEVICE FOR MEASURING SMALL CHANGES IN THE THICKNESS PROFILE OF BAND-SHAPED MATERIAL PARTICULARLY PHOTOGRAPHIC BASE PAPER

[75] Inventors: Waldemar Vossbeck, Mettingen; Hans-Dieter Bode, Bohmte, both of Fed. Rep. of Germany

[73] Assignee: Felix Schoeller Jr. GmbH & Co. KG, Fed. Rep. of Germany

[21] Appl. No.: 157,728

[22] Filed: Feb. 18, 1988

[30] Foreign Application Priority Data

Feb. 19, 1987 [DE] Fed. Rep. of Germany ....... 3705201

[51] Int. Cl.$^4$ .......... G01B 5/06

[52] U.S. Cl. .......... 73/159

[58] Field of Search .......... 73/104, 105, 159

[56] References Cited

U.S. PATENT DOCUMENTS 4,513,613 4/1985 Darves-Bornoz et al. .......... 73/159

FOREIGN PATENT DOCUMENTS 678021 7/1939 Fed. Rep. of Germany .

2054505 11/1970 Fed. Rep. of Germany ........ 73/159

3231965 3/1984 Fed. Rep. of Germany .

28194 4/1964 German Democratic Rep. .

0818345 8/1959 United Kingdom ................. 73/105

*Primary Examiner*—Stewart J. Levy

*Assistant Examiner*—Robert P. Bell

*Attorney, Agent, or Firm*—Allegretti & Witcoff, Ltd.

[57] ABSTRACT

There is described a method and apparatus for measuring small changes in the thickness profile of band-shaped or web material wound onto a reel, such as photographic base paper. The invention includes a measuring sensor with a scanning tip. The measuring sensor is positioned in the center of the rectangular block. The block and sensor are supported in a movable manner in a casing which is moved in an axial direction over the surface of the reel. The length of the block preferably contributes a mechanical amplification of the sensed variation in thickness profile of the web material.

3 Claims, 2 Drawing Sheets

17
10
9
L
20
19
x
21
18
16
22
a
z

DEVICE FOR MEASURING SMALL CHANGES IN THE THICKNESS PROFILE OF BAND-SHAPED MATERIAL PARTICULARLY PHOTOGRAPHIC BASE PAPER

BACKGROUND OF THE INVENTION

The invention concerns a technique for measuring small changes in the thickness profile of band-shaped materials, i.e., materials such as paper which are produced in a continuous web. The invention relates particularly to measuring small changes in the thickness profile of photographic base papers. A method and apparatus is described here for measuring relatively small changes in the thickness profile of band-shaped or web material in a coiled or wound condition. The device includes a measuring sensor with a scanning tip which is supported in a movable manner by a block and casing and which are moved in an axial direction over the surface of a reel of the material. The measuring sensor is positioned in the center of the rectangular block. The dimension of the block thereby preferably adds a multiple factor to the change of thickness profile to be determined.

During the production and processing of band-shaped or web material, for example, during the rolling of photographic paper material, tensions arise through the movement of material between the rollers, or roller frames, or a winch, or the like. This tension can lead to a deformation of the band-shaped or web material. The tension must be measured in order for a consistent traction to be maintained on the band material.

One known technique involves positioning a conventional tension measuring device between two roller frames or between one roller frame and a winch. Such a tension measuring device might abut the band-shaped or web paper and respond to a pressure exerted against the moving web. One such tension measuring device might be positioned on each side of the band or web during rolling. Additional devices may differentially compute and indicate the response of the tension measuring devices so as to monitor the distribution of tension over the width of the band or web. Such devices are disclosed for example in DE-PS No. 678 021.

A further known technique allows band-shaped or web materials to run over a series of rollers in relation to the thickness profile. The measuring rollers are biased for elastic, resilient movement. Additional rollers that support the springs or bias means are positioned between the measuring rollers. The measuring rollers change position in response to changes of the thickness profile of the band-shaped or web material since they remain in contact with the surface of the material. The measuring rollers produce electrical control signals in relation to such changes in position.

As taught by DD-PS No. 28 194, a further known technique positions a number of rollers in a floating manner on a common axis. The rollers maintain contact with the band or web material and scan the material at least at three points. The rollers change position as the thickness profile of the material changes. Changes in roller position create electrical voltage signals. The electrical signals can be used via a feedback control circuit to alter adjustment of the rollers.

The known techniques are expensive and relatively limited in sensitivity to thickness measurement. They can measure and control thickness of the band-shaped or web material only to the same manufacturing tolerance as that embodied in the measuring tool, e.g., the roller frame. These known techniques do not have the ability to mechanically amplify the physical movement of the measuring tool in relation to the physical deformity, or variation, in thickness of the band or web material.

It is furthermore known (DE-OS No. 32 31 965) to measure the thickness profile of band-shaped or web material with a device which includes a square-shaped measuring head with a boring with a measuring sensor which is supported in a springing elastic manner upwardly and downwardly, which produces electrical signals, so that the measuring head and the measuring sensor are in contact with the surface to be measured. By means of such a device, it should be possible to measure, for example, thickness differences of a coated paper tape, which can be detected as a bulge, if the paper band is rolled up on the roller. In the case of paper, this involves, for example, a photographic base paper, which is coated with polyethylene. In practice, however, it has been shown that this device works very imprecisely and does not permit reliable measuring results which could permit conclusions regarding specific thickness changes, particularly not if these changes in thickness are small and if the roller varies greatly in its consistency.

SUMMARY OF THE INVENTION

It is thus an object of the present invention to create a device by which the thickness profile of a band-shaped or web material, preferably a coated photographic base paper, can be accurately measured even if there are slight variations in paper thickness and rolling consistency.

This object is achieved through the use of an axially movable, spring-loaded measuring sensor which is positioned in a central boring of a vertically and axially movable block. The block is positioned in a casing which holds the block in axial alignment in relation to the surface of the paper reel. The measuring sensor, with its measuring tip, stands in contact with the surface to be scanned while the block slides axially band and forth over the surface of the cylindrical reel to be scanned. The external longitudinal edges of the casing are provided with spacers, which slide on the reel surface of the paper at a distance from the movable block and the measuring sensor.

As a consequence of the technique of the invention, the thickness profile of the band-shaped material is measured by means of the above-described device in a particular manner of processing. The device is moved not over the band-shaped or web material which is extended under tension, but rather over the surface of the band-shaped or web material which is already rolled up on the reel. The thickness variation is distinguished through the formation of a bulge, which is created in the circumferential direction around the paper reel if several loops lie on top of one another. This approach avoids the difficulty of trying to measure the thickness of individual pieces of paper, since the change of thickness in the individual web or paper is so slight that it cannot be practically measured under high speed processing conditions.

The device in accordance with the invention is positioned in a carriage-like framework and supported over the cylindrical reel of band-shaped or web material. The block and measuring sensor is moved in an axial direction, whether by hand or mechanically, over the surface of the band or web material accumulated on the cylindrical reel. As a result of such axial movement, the tip of the measuring sensor and the surface of the block containing the measuring sensor oriented to the reel surface, scan the surface of the material accumulated on the reel.

The casing, which contains the block and measuring sensor positioned therein, rests with its spacers on the reel surface of the paper, but does not, however, influence the movement of block or measuring sensor. The casing ensures that the block with the measuring sensor will not tilt in the radial direction, i.e., will not shift in a direction circumferential about the cylindrical roll. The casing also ensures that the block with measuring surface is not pressured or stressed against the paper reel as a result of the handling movement of the block. Thus, the independently of the weight of the device and its movement over the surface of the roller, the measuring sensor and the block accommodating it can scan the surface of the band material accumulated on the reel.

Based on the position of the measuring sensor in the block, the measuring sensor cannot be moved beyond the lower edge of the block at any weak point of the roll, as is the case in the prior known devices. Thus, invention scans the surface in a manner undistorted by weak roll points.

Variations in thickness or "bulges" in a sheet of photographic paper could previously not be determined before emulsification. As a result, high rejection rates of emulsified paper occurred. A great deal of time and money was wasted in handling and dealing with the defective paper prior to determination of the defect.

The scanning process in prior devices could be distorted overall by the support pressure of the device. By way of contrast, in the present device, such movement occurs only through the fact that the block with the measuring sensor, upon reaching a bulge which runs in the circumferential direction of the paper roll, rises with its forward edge on the incline of the bulge. The measuring sensor thereby moves more and more outwardly from the block in the radial direction inward toward the central axis of the reel, until the forward edge of the block has reached the peak of the bulge. With a further motion of the block over the bulge, the measuring sensor then recedes more and more, and, upon reaching the peak of the bulge, entirely recedes into the block. After exceeding the peak of the bulge and after the tipping of the block, the measuring sensor reappears at the other side of the bulge, and a corresponding reverse motion process repeats on the other side of the bulge. The measuring sensor is thereby preferably positioned on the longitudinal central line of the block. The axial motion of the measuring sensor in a line substantially parallel to the central axis of the cylindrical roll produces electrical signals which are processed to indicate variation in thickness of the band material.

The changing thickness of the coating material, for example, polyethylene ("PE") on the base paper sheet, is essentially caused by the fact that the lips of the slot die which apply the polyethylene, and thereby the nozzle width, vary at specific points. As a result, more polyethylene exits at some points than at the other points. Such differences of thickness in the polyethylene, if they exceed certain values, lead to overexpansion of the paper which remain with the sheet as "bulges". Such bulges are disadvantageous, for example, in the application of a photographic emulsion. The same applies for color emulsions as well, since less emulsion is deposited on the thicker points than at the other points. Color distortions can result in the developed picture. As is well understood in the art of making photographic paper, the quality of the photographic image requires the emulsion to be applied in a highly critical manner, requiring close tolerance and strict uniformity.

The length of the measuring block is of specific significance for obtaining a correctly representative measurement, since the sensor rises vertically (i.e., radially outward away from the center axis of the cylindrical reel) as much as permitted by the length of the block in relation to the reel surface to be scanned. An infinitely long measuring block would therefore be theoretically the most advantageous. It has, however, been shown that excellent results are attained if the measuring block has a length which roughly corresponds to double the base width of the bulge to be expected. The most practical advantageous widths derive from experience. Preferably, the length of the measuring block, in the center of which the measuring sensor is positioned, amounts to some predetermined multiple of the base width of the most probable forming bulge. Since such bulge formations only appear now and then, experience is necessary for the coating of particular webs, such as photographic base paper, or in the use of certain nozzle forms.

The measuring sensor per se is a known type of device. The measuring sensor is positioned for axial movement with the central bore of the block. The block consists of a suitable material, for example, plastic or light metal. The surface of the block which contacts the reel surface is as smooth as possible; it has a low coefficient of friction. It is also possible to make the block from a material such as steel and to polish the surface which stands in contact with the reel surface, or to solidly chrome plate it, so that the frictional resistance is as low as possible.

BRIEF DESCRIPTION OF THE DRAWINGS

The invention will now be illustrated by means of a preferred embodiment which is schematically shown in the drawing.

DETAILED DESCRIPTION OF THE PREFERRED EMBODIMENT

Figures 1, 2:
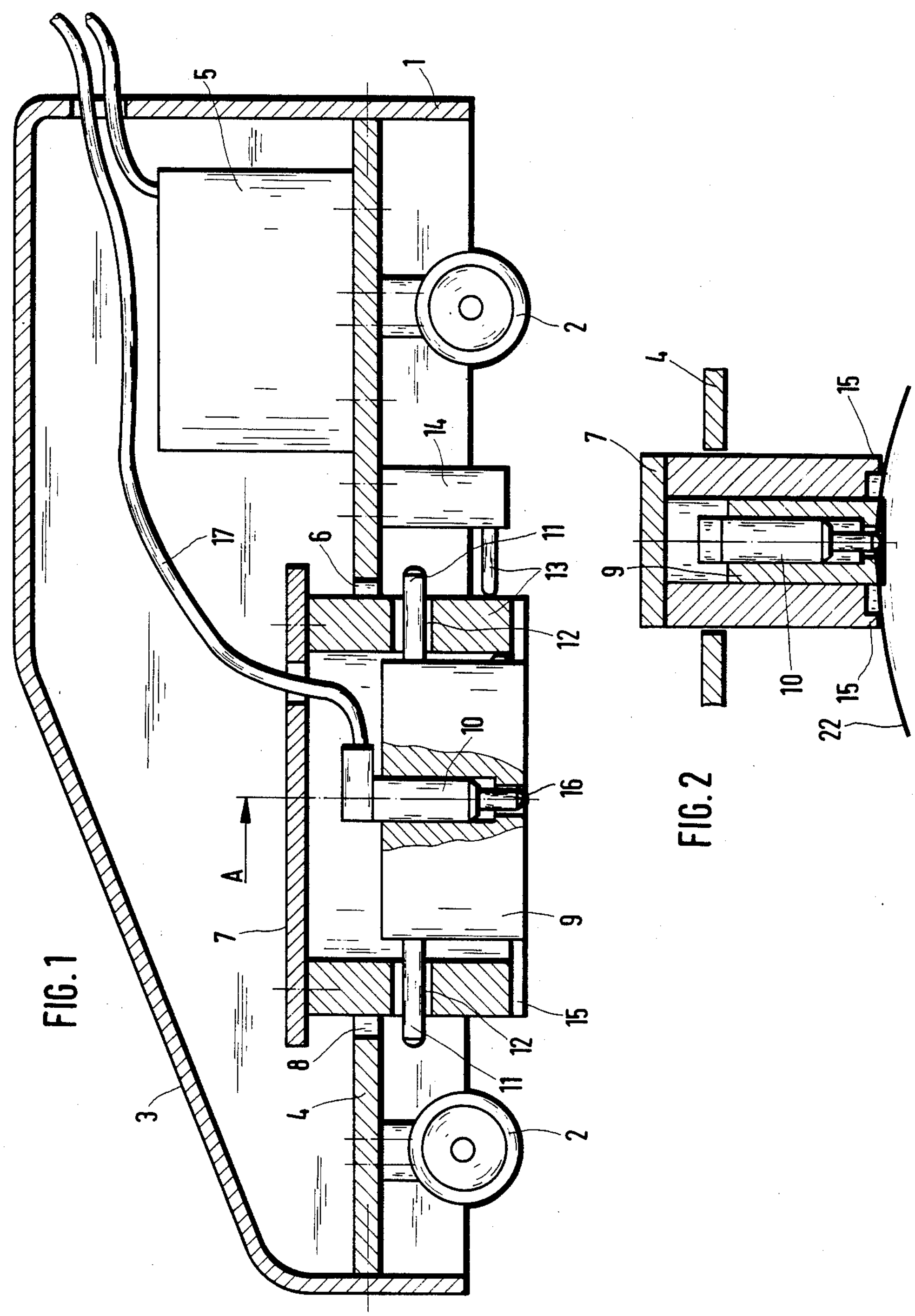
FIG. 1 depicts in longitudinal section an embodiment of a device in accordance with the invention.
FIG. 2 depicts a cross-section of the device shown in FIG. 1 along the line A—A of FIG. 1.

As can be seen from FIG. 1, the measuring device itself is positioned on a carriage (1), which is provided with wheels (2). The carriage-like framework (1) is provided with a covering (3), which simultaneously serves as a handling mechanism, as will be further illustrated in greater detail. Within the frame (1), a floor or base (4) is positioned, on which electrical devices (5), which are necessary for the measuring process or the like, are provided. The base (4) contains an opening or recess (6) in which a casing (7) is positioned. A certain tolerance of play, as is evident at (8), is allowed between the casing (7) and the base (4) so that the casing (7) can thus move within the recess (6) to a certain extent.

The casing (7) provides an open chamber or space therewithin. The block (9), which contains the measuring sensor (10), is mounted within the open space inside casing (7). The block (9) is provided with pegs (11) on both its ends. The pegs are mounted on support holes or recesses (12) in the casing (7). The block (9) can thereby move therein in an axial direction, relative to the paper roll, i.e., left or right as illustrated in relation to the paper roll in FIG. 1. The paper roll can also be scanned in a radial direction on the reel surface, i.e., up and down as illustrated in relation to the peel surface of FIG. 3. The reel surface is indicated in FIG. 2 by the line (22).

The block (9) can therefore move, with regard to the drawing, FIG. 1, both upwardly as well as downwardly, and either to the right or to the left. The casing (7) itself is likewise in its turn easy to move, and abuts on a peg (13), which is attached by brace (14) to the base (4). The peg 13 can be used to adjust the tolerance (8) of the block (9) within the casing (2). Furthermore, the lateral longitudinal edges of the casing (7), as shown at (15), provide spacers which facilitate sliding movement of the block over the reel surface (22), but which are, however, sufficiently removed from the block (9) so that they do not influence the measuring results through deformation of the bulge on the reel surface.

Likewise, the block (9) with the measuring sensor (10) lies with only its own weight on the reel surface (22). The casing (7) with the spacers (15) provides guidance of the block (9) with only the measuring sensor (10) on the reel surface (22), but without creating additional friction between the block (9) and the reel surface (22). The casing (7) is therefore preferably significantly longer and wider than would be necessary for merely the reception of the block (9).

The electrical signals which are generated by the measuring sensor (10), or more specifically, through the back and forth motion of its scanning tip (16), are conducted by means of the electrical line (17) to corresponding transformers or indicator devices or the like, which then record a corresponding profile of the reel surface. The electronics which compute and convert the movement signals into thickness readings are substantially conventional and are readily understood by a person of skill in the art with further description herein.

Figure 3:
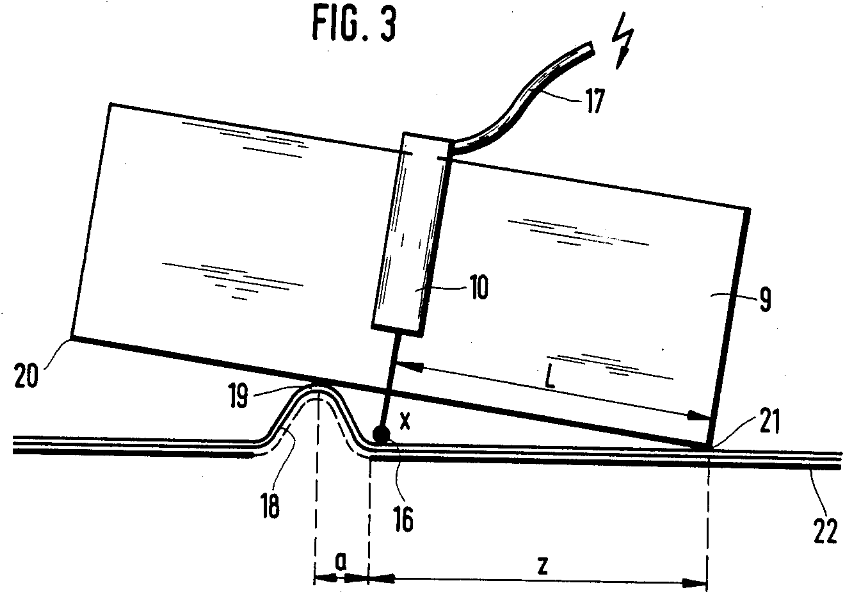
FIG. 3 shows in schematic form the measuring process whereby the measuring sensor and the block containing this sensor are used according to the invention.

The roll or reel surface (22) has a bulge at (18) as shown in FIG. 3. This bulge should now be detected and determined as to its size. This takes place, with the device in accordance with the invention, through the fact that the block (9) with the measuring sensor (10) is moved along on the reel surface (22) generally in a direction parallel to the axis of the cylindrical roll. The bulge (18) runs in the circumferential direction of the reel (FIG. 3).

The measuring process has now started, since it can be seen that the block (9) is already lying almost at the half-way point on the peak of the bulge (18). To the same extent that the block (9), considered with regard to the arrow (P), moves to the left, the scanning tip (16) of the measuring sensor (10) moves out from the block (9), since it is spring-loaded, i.e., biased, to remain in contact with the reel surface (22) of the paper.

Upon further movement of the block (9) with the measuring sensor (10) to the left, the scanning tip (16) moves back into the block (9), as the block (9) slides up on the inclination of the bulge (18) to the peak point (19).

This process now proceeds in a reversed direction on the left side of the bulge, after the block (9) has shifted to the left, as referenced to FIG. 3, so that its edge (20) now lies on the reel surface (22), while the edge (21) separates from the reel surface (22).

The thickness variations of individual sheets can arise, for example, through the coating of the base paper with the fusible polyethylene. The thickness variations affect the thickness of individual sheets only to a very slight degree. Upon reaching a certain thickness, however, the variations also act through the excess expansion of the roller in a harmful manner, particularly if the emulsified paper is later exposed and developed. The determination of the thickness variations in the individual paper sheets is therefore not realistically possible. If several sheets are placed above one another, for example, after the paper sheet has been wound up on the roll to the extent of 200 or more windings, the thickness variations add up to a material variation which can be effectively measured.

The half length (L) of the block (9), that is, the distance between the center of the block (9), where the measuring sensor (16) emerges from the central bore, and the edge of the block (9), should have a dimension equal to at least the base width of the bulge which is forming, so that the entire block then has the length of 2L. The block (9) is preferably longer, however, for example, 4L, so that it does not depend in the final analysis on the type of the material to be scanned or the applying device and the like.

The block (9) consists of a suitable material, for example, plastic or metal. The surface of the block (9) in contact with the reel surface (22) of the material to be scanned should produce as little frictional resistance as possible if the device is moved over the reel surface, as described above. That is, the block (9) is supported by the casing (7) and carriage (1) in a "weight-relieved manner" in relation to the reel surface (22). Preferably the block (9) is supported by the casing (7) and carriage (1) in such a manner that neither casing (7) not the carriage (1) contribute to friction between the block (9) and the reel surface (22) as the block (9) is moved across the reel surface (22).

Changes of thickness profiles, for example, in the PE coating of photographic base papers, have particularly damaging effects if the height or the inclination angle of the bulge (18), which forms the change of thickness profile reach the point that excess expansions can occur. In such event, photographic emulsions in the coating of such a profile change or vary in thickness, so that elongated strip-shaped color distortions become distinctly visible after the development of the paper. There exists a certain desirable ratio between overall block length and the bulge height through which, in turn, the axial mobility of the scanning sensor (16) is influenced. This ratio is best determined empirically, depending on the type of determination or purpose of application of the coated material. For PE-coated photographic papers, this ratio may be determined, for example, in accordance with the following equations:

$$Z=\sqrt{X^2+L^2};$$

$$H=(X/L)(A+\sqrt{X^2+L^2}).$$

in which x=is the axial stroke height of the scanning sensor;

h=is the critical height of the possibly arising bulge (18);

L=is the half length of the block (9); and:

a=is the half base width of the bulge (18).

The above description relates to a preferred embodiment of the invention. However, alternate configurations and modifications are possible within the scope of the invention. Therefore, the subject matter of the invention is to be limited only by the following claims and their equivalents.

What is claimed is:

1. A device for measuring relatively small changes in the thickness profile of web material wound on a reel, comprising in combination a block, a measuring sensor positioned in said block in an adjustable manner, said sensor being in contact with the surface of the web material, said block being positioned within a casing in a moveable and weight-relieved manner, said casing being in contact with the surface of the material to be measured on both sides of the measuring sensor, said casing being supported by a carriage which can be moved in relation to the reel, wherein movement of the device over a change in thickness of the web material produces: (i) no radial movement of the casing, (ii) radial movement in a first direction of the block in relation to the reel, and (iii) radial movement in a direction substantially opposite to the first direction by the measuring sensor in relation to the block.

2. A device for measuring relatively small changes in the thickness profile of web material wound on a reel, comprising in combination a block, a measuring sensor positioned in said block in an adjustable manner, said sensor being in contact with the surface of the web material, said block being positioned within a casing in a moveable and weight-relieved manner, said casing being in contact with the surface of the material to be measured on both sides of the measuring sensor, said casing being supported by a carrier which can be moved in relation to the reel, wherein the casing (7) has a rectangular section and a rectangular base plane, and recesses (12) that are formed in the frontal walls opposing one another, into which recesses the pegs (11) of the block (9) engage such that the block and measuring sensor are mounted within the casing.

3. A device in accordance with claim 4, wherein an engaging piece of the carriage-like framework, consisting of a peg (13) and a block (14), carries the casing (7) along, if the framework (1) moves over the reel of the web material.

* * * * *